Jan. 11, 1966 N. B. PROCTOR 3,228,232
ULTRASONIC INSPECTION DEVICE
Filed Aug. 23, 1962 5 Sheets-Sheet 1
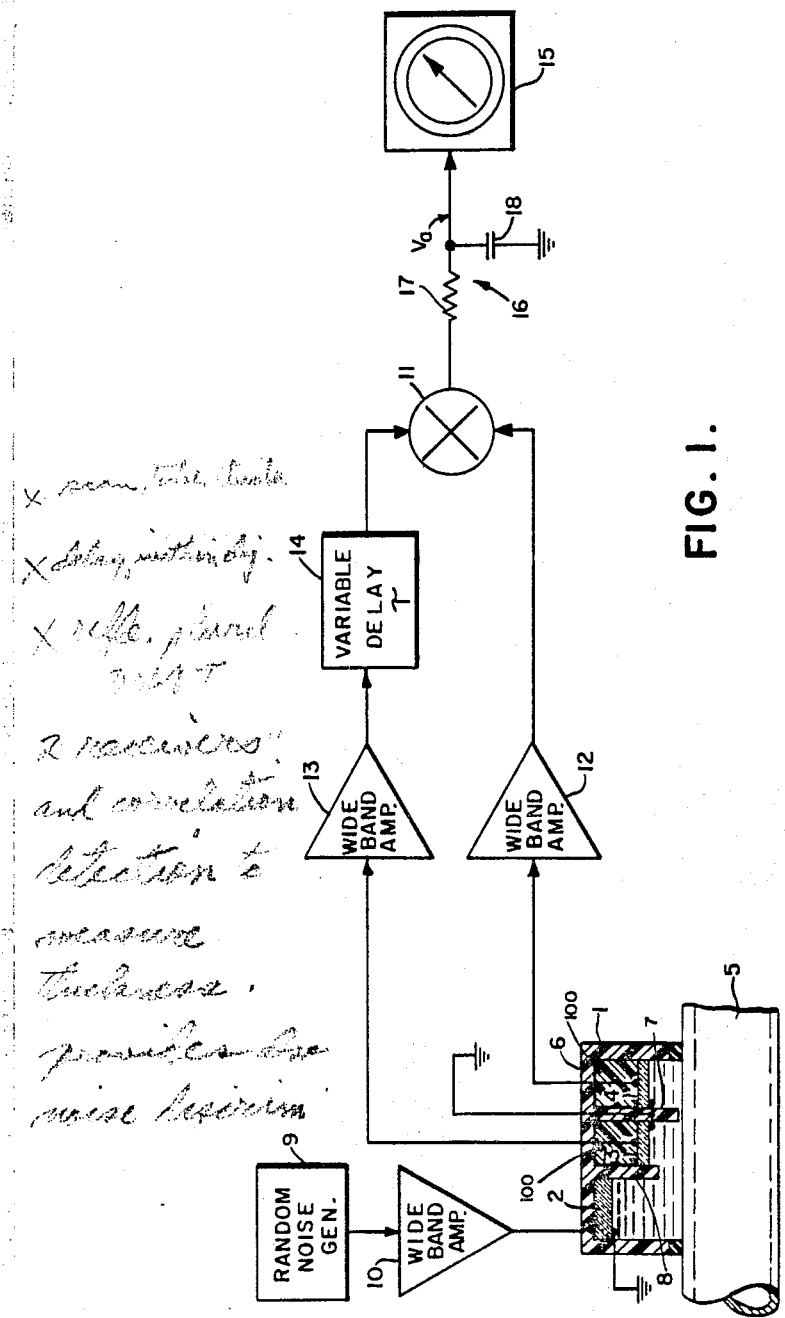
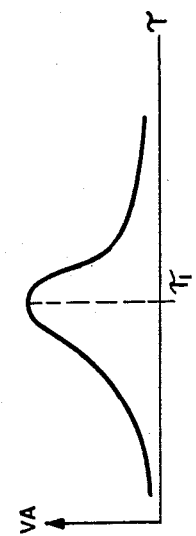
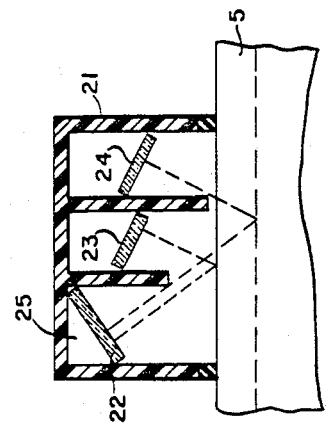
INVENTOR
NOEL B. PROCTOR
BY
ATTORNEY

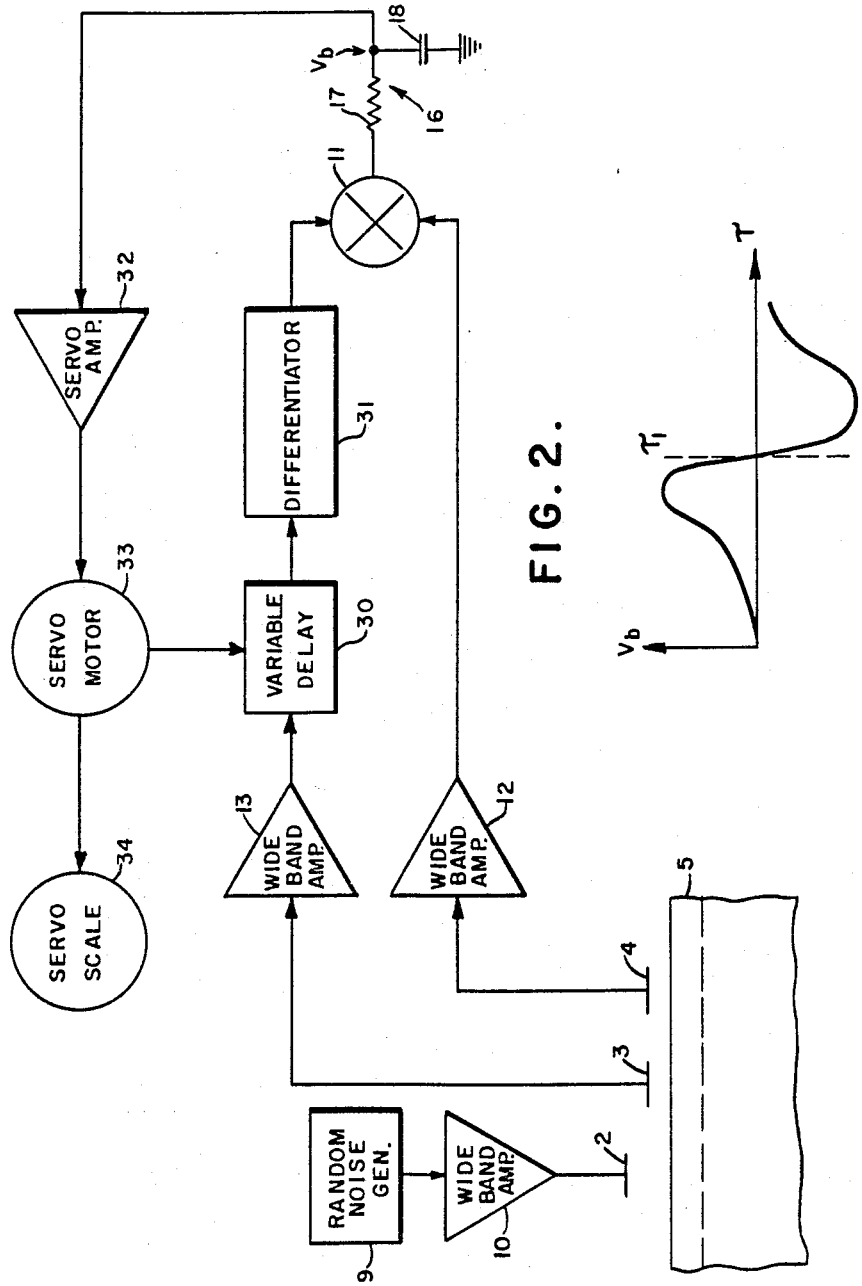

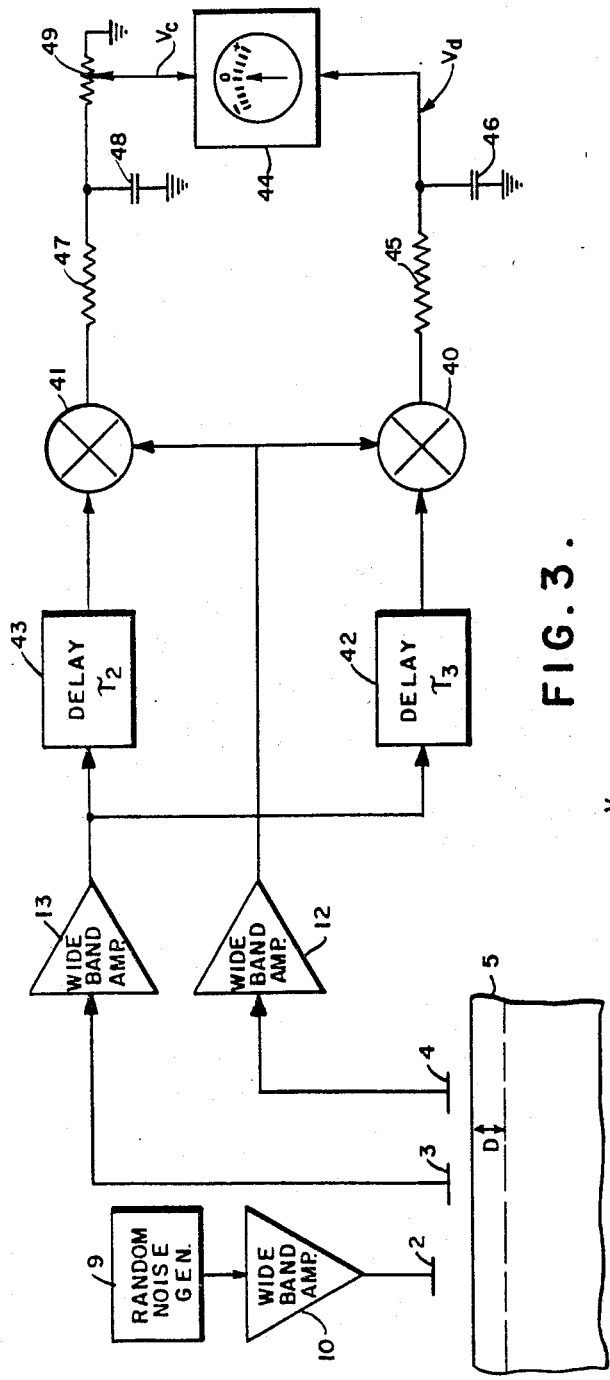
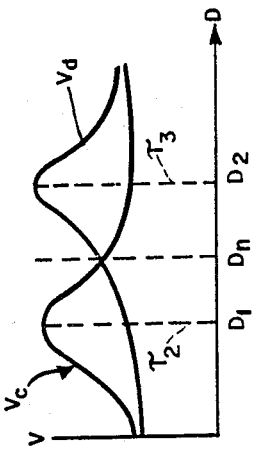
FIG. 3.
FIG. 3a.

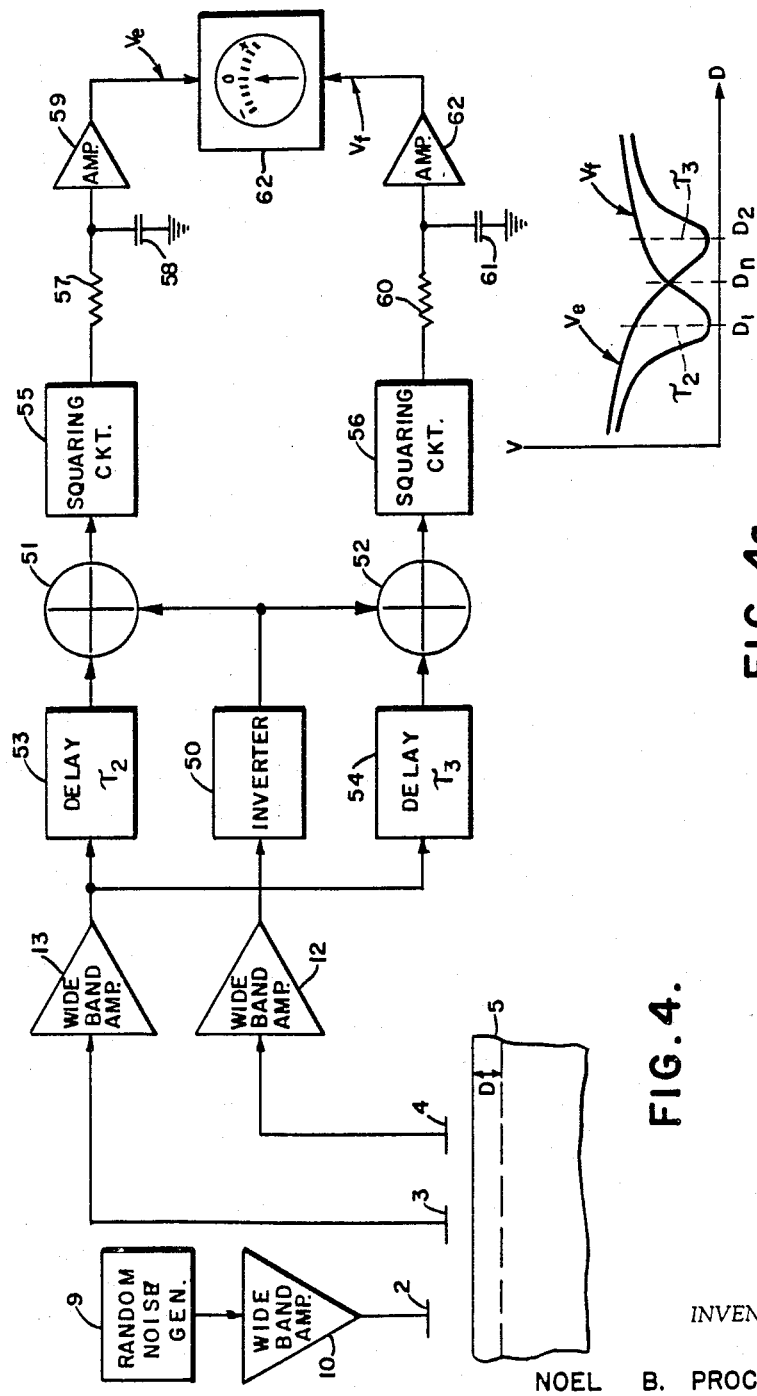

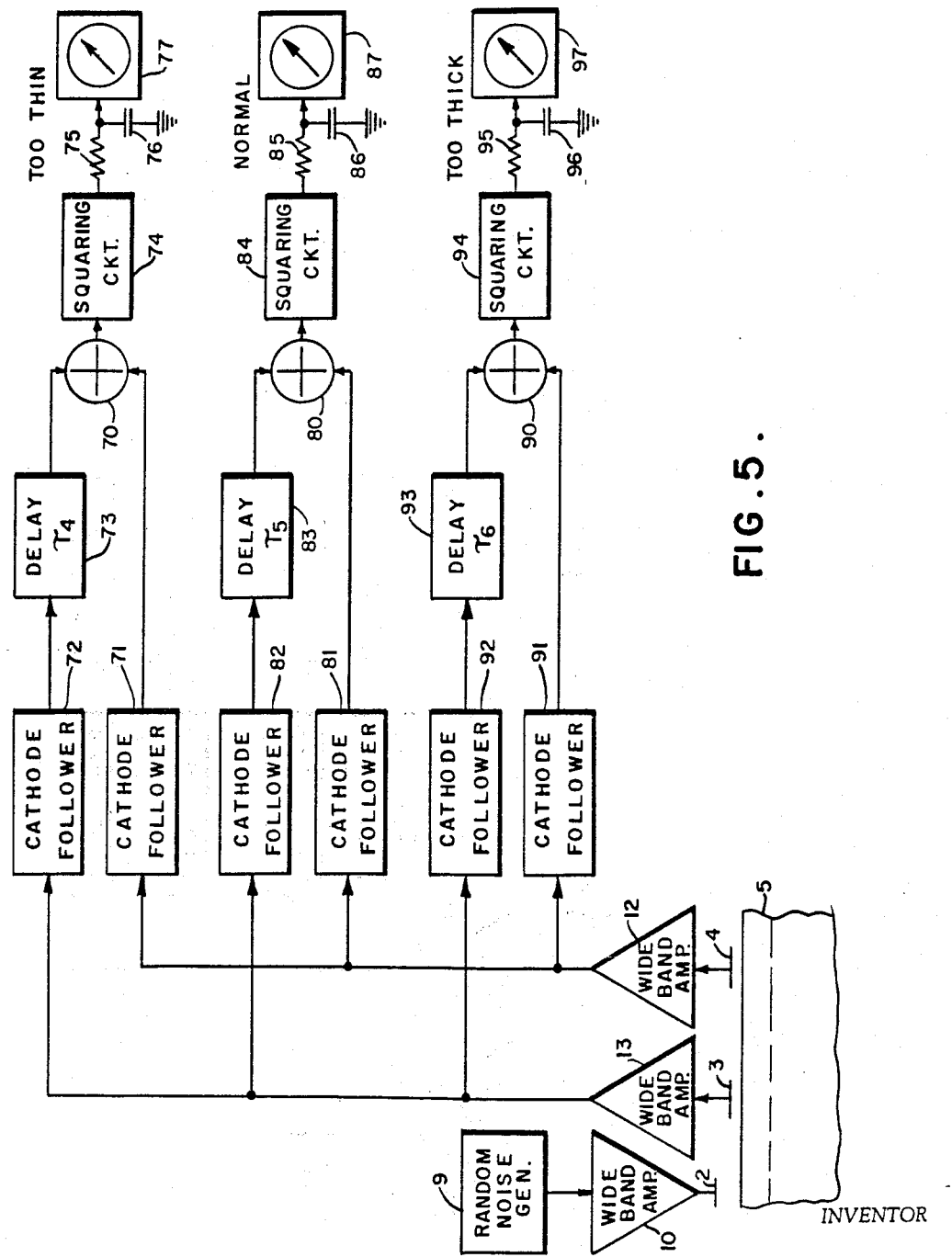

United States Patent Office 3,228,232
Patented Jan. 11, 1966

3,228,232
ULTRASONIC INSPECTION DEVICE
Noel B. Proctor, Houston, Tex., assignor, by mesne assignments, to American Machine & Foundry Company, New York, N.Y., a corporation of New Jersey
Filed Aug. 23, 1962, Ser. No. 218,913
7 Claims. (Cl. 73—67.7)

This invention relates to thickness measuring apparatus and more particularly to methods and apparatus for using ultrasonic energy in making thickness measurements.

There are numerous instances where it is necessary to measure the distance between an accessible surface and an inaccessible surface of a member, such as when measuring the wall thickness of a long tubular member. It has been demonstrated that various systems using ultrasonic energy are capable of making such measurements. Past systems have been of two basic types, namely, resonance systems and echo ranging systems.

In resonance systems, ultrasonic energy is induced in the member to be measured, usually by means of a transducer connected to a variable frequency oscillator. It is a known phenomenon that resonance will occur when the wave length of the applied ultrasonic energy is an integral multiple of the distance traveled through the member. The resonant frequencies can be determined by changing the oscillator frequency until a maximum oscillator loading occurs, or if a separate receiving transducer is utilized to detect the energy after passing through the member, by changing the oscillator frequency until a maximum output signal is detected. While these resonance systems are useful in certain instances, there are a number of disadvantages which prevent their general use. First, there are numerous factors other than the dimensions of the member being measured which affect resonance and it is often difficult to arrange the apparatus such that the dimension being measured is the only variable. Another disadvantage is that very accurately calibrated variable frequency oscillators or other frequency indicating apparatus must be utilized. Furthermore, if the member being measured has pitted or uneven surfaces, or includes flaws or other discontinuities, the magnitude of extraneous noise signals makes it extremely difficult and often impossible to determine the resonant frequencies.

Echo ranging systems are similar in operation to sonar and radar systems. In the ultrasonic echo ranging systems, pulse energy is induced in the member being measured such that the pulse energy is reflected off the nonaccessible surface and subsequently detected as an echo. The round-trip travel time for the pulse is proportional to distance traveled and therefore can be used as a measure of distance between two surfaces. The required apparatus for measuring the time intervals is costly and difficult to adjust. Furthermore, where the member being measured has pitted or uneven surfaces, the pulse energy is scattered and echoes are difficult to distinguish from the extraneous noise.

An object of this invention is to set forth a new ultrasonic measuring system which is a complete departure from past resonance and echo ranging systems and which avoids known disadvantages of these earlier systems.

Another object of this invention is to provide ultrasonic measuring apparatus which is relatively unaffected by extraneous noise caused by passing ultrasonic energy through the member being measured and stray reflections.

Still another object is to provide relatively uncomplicated apparatus capable of making accurate thickness measurements by means of correlation techniques.

In accordance with the new system set forth by this invention, ultrasonic vibration energy of any convenient type is directed toward the member to be measured. A first receiving transducer is adjusted to respond to ultrasonic energy reflected off one of the surfaces, preferably the accessible surface, and a second receiving transducer is adjusted to respond to energy reflected off another surface such as the inaccessible surface. The receiving transducers are connected to a correlation detector which measures the difference in travel required for the ultrasonic energy to reach the receiving transducers. The difference in travel time is proportional to the difference in traveled distance and, thus, is a measure of the distance between the surfaces.

The apparatus, in accordance with this new system, is described and shown in greater detail in the following specification and drawings, which form a portion of the specification and wherein, FIG. 1 is a schematic diagram illustrating the invention in accorance with one embodiment;

FIG. 1a is a modified transducer housing arrangement suitable for use with the FIG. 1 apparatus;

FIG. 1b is a diagram illustrating the output characteristic of the FIG. 1 apparatus;

FIG. 2 is a schematic diagram of apparatus in accordance with another embodiment;

FIG. 2a is a diagram illustrating the output characteristic of the FIG. 2 apparatus;

FIG. 3 is a schematic diagram of apparatus in accordance with still another embodiment;

FIG. 3a is a diagram illustrating the output characteristic of the FIG. 3 apparatus;

FIG. 4 is a schematic diagram of apparatus in accordance with yet another embodiment;

FIG. 4a is a diagram illustrating the output characteristics of the FIG. 4 apparatus; and FIG. 5 is a schematic diagram of apparatus in accordance with still another embodiment.

Referring first to FIG. 1, the apparatus is illustrated including a transducer housing 1 which maintains a transmitting transducer 2, and a pair of receiving transducers 3 and 4 in appropriate positions with respect to a tubular member 5, the wall thickness of which is being measured.

Transmitting transducer 2 is constructed of a suitable piezoelectric material such as quartz. The flat transmitting surface of transducer 2, and the side opposite, are each coated with a metallic, electric conducting film. Thus, when a potential is applied between the coated surfaces, current flows through the transducer causing a corresponding change in transducer dimensions, in accordance with the reverse piezoelectric effect. The receiving transducers are similarly constructed. When the receiving transducers are vibrated, they provide a corresponding electrical potential between the coated surfaces in accordance with the piezoelectric effect.

The transducer housing is integrally molded from Bakelite or similar nonultrasonic energy transmitting material. The housing includes a rectangular base member 6 and four downwardly extending (as viewed) side walls integrally connected to the edges of the base member. The side walls are shaped to conform to the cylindrical surface of tubular member 5 and have rubber sealing strips connected to the edges adjacent the tubular member. Three, approximately equal, chambers are defined within the transducer housing by partitions 7 and 8 which extend laterally across the housing, partition 7 extending to the surface of tubular member 5 and partition 8 extending only part way. While the transducer housing 1 is illustrated in FIG. 1 as having substantial longitudinal dimensions relative to the wall thickness, in actual construction the longitudinal dimensions would be minimized and substantially less than shown.

Transmitting transducer 2 is secured in the chamber between partition 8 and one of the side walls by cementing the transducer to the base member and wall of the associated chamber. When secured in this manner, the transmitting transducer is highly damped, or, in other words, the transducer will not vibrate after energization thereof ceases. The transmitting transducer 2 has a flat front side facing the outside surface of pipe 5 and substantially parallel thereto. The receiving transducers are secured in the other two chambers, at positions spaced from base members 6, by cementing the edges of the transducers of the walls of their respective chambers and cementing the sides to backing plates 100 made of an appropriate damping material and secured to the base member 6. When secured in this manner, the receiving transducers can respond to vibrations to which subjected. The receiving transducers 3 and 4 each have a flat front side facing the outside surface of pipe 6 and parallel thereto. The two faces lie in a common plane, somewhat closer to the pipe 6 than the transmitting transducer 2.

The portions of the chambers in the transducer housing between the transducers and the surface of tubular member 5 are filled with a suitable acoustic coupling medium such as water mixed with a wetting agent to prevent any bubbles from forming in the medium. It is anticipated that some of the liquid will escape from the chambers and, therefore, additional liquid is continuously supplied via a suitable inlet (not shown) to insure that the chambers are filled at all times.

The input to transmitting transducer 2 is an electrical signal having a wide band of simultaneously generated frequencies. The illustrated circuits for energizing the transmitting transducer include a random noise generator 9 connected to one of the coated surfaces of transmitting transducer 2 via a wide band amplifier 10, the other coated surface of the transmitting transducer being connected to ground. The random noise generator 9 produces an electrical output signal characterized by a large number of overlapping transient disturbances occurring at random. The output can be continuous and contain a wide band of frequencies at a substantial energy level. A typical energy-frequency relationship for a random noise generator can be a straight line, either horizontal or inclined, falling off at the ends. A Gaussian probability distribution, representing a flat energy-frequency spectrum, can be utilized as the input to the transmitting transducer 2.

The random noise generator 9 may be of several conventional designs that are commercially available. For example, a gas-discharge tube with a transverse magnetic field applied can be used as a noise source to produce a substantially flat energy-frequency spectrum. One of the primary advantages of the use of a continuous random frequency generator 9 is the high level signal produced by transmitting transducer 2 that "hammers" on pipe 6. A substantial power can be delivered to the transmitting transducer 2 wtihout exceeding the breakdown voltage of a crystal, for example.

The transmitting transducer, when energized by the noise signal, produces corresponding compression waves in the form of an ultrasonic vibration signal which is propagated toward the tubular member through the coupling medium. A portion of the ultrasonic energy is reflected off the outer surface of the tubular member toward receiving transducer 3, thus passing beneath partition 8. The remaining portion of the ultrasonic energy enters the tubular member and is reflected off the inner surface thereof toward receiving transducer 4. Partition 7 prevents the energy which is reflected off the outer surface of the tubular member from reaching receiving transducer 4. The energy reflected off the inner surface of tubular member 5 is also received by receiving transducer 3, but this energy has a negligible effect since it is considerably attenuated as compared to the energy reflected off the outer surface. It should be noted that the signals detected by the two receiving transducers are essentially the same, except that these signals arrive at the respective receiving transducers at different times because of the different travel distances involved.

One of the coated surfaces of each of the receiving transducers is connected to ground and the other coated surfaces are connected to a correlation detection circuit. More specifically, the other surface of receiving transducer 4 is connected to one input of a multiplier circuit 11 via a wide band amplifier 12. The other coated surface of receiving transducer 3 is connected to the other input of multiplying circuit 11 via a wide band amplifier 13 and a variable time delay circuit 14. Amplifiers 12 and 13 are similar to wide band amplifier 10. The variable time delay circuit 14 is of any conventional nonfrequency discriminating type capable of delaying an electrical signal in the megacycle range. The multiplying circuit 11 is of conventional design and produces an output signal which is the product of the input signals. It should be noted that if either of the input signals to the multiplier is of zero magnitude, the output signal is always zero regardless of the signal magnitude at the other input. The output of multiplier circuit 11 is connected to a voltage responsive meter 15 via an integrating circuit 16. The integrating circuit includes a resistor 17 connected between the multiplier circuit and the meter, and a capacitor 18 connected between the meter input and ground.

The output signal from multiplier circuit 11 has a maximum value when there is correlation between the input signals, or in other words when the input signals are essentially the same. The input signals applied to the multiplier circuit can be brought into correlation by adjusting variable time delay circuit 14 such that the time delay provided is equal to the difference in time required for the ultrasonic energy to reach receiving transducer 3 after reflection off the outer surface of the tubular member and the time required for the ultrasonic energy to reach receiving transducer 4 after reflection off the inner surface. As the time delay provided deviates from the value at which correlation occurs, the magnitude of the output signal from multiplier circuit 11 decreases accordingly. The relationship between the integrated output signal $V_a$, as is measured by meter 15, and the time delay $\tau$ provided by circuit 14 is illustrated in FIG. 1b, the time delay $\tau_1$ being that at which correlation occurs. The value of $\tau_1$ varies directly in accordance with the difference in travel time required for ultrasonic energy to reach the respective receiving transducers. The energy received by transducer 3 is reflected off the outer surface, and the energy received by transducer 4 is reflected off the inner surface and therefore the difference in travel time is essentially the round-trip travel time through the wall of tubular member 5. This round-trip travel time is directly proportional to the wall thickness and therefore the value $\tau_1$ is a measure of wall thickness. Accordingly, the value of $\tau_1$ will vary in accordance with the variations in wall thickness.

The extraneous signals detected by one of the receiving transducers, as can be caused by distortion of the ultrasonic signal while traveling toward the receiving transducer or by miscellaneous reflections off surface irregularities and other discontinuities do not have counterpart signals detected by the other receiving transducer. This is because of the different paths traveled by the ultrasonic energy and the different locations of the transducers. The extraneous signals are therefore cancelled in the multiplier circuit and have no substantial effect regardless of magnitude.

It should be noted that the transmitting transducer is energized by a wide band random noise signal. Other types of signals can be used but are usually less desirable since these signals would be periodic to some extent and therefore some correlation could occur for time delays other than that corresponding to the difference in travel time. If, however, a completely random noise signal is used, only one particular time delay can bring about correlation.

When placed in operation, time delay circuit 14 is merely adjusted to obtain a maximum indication on meter 15. Time delay circuit 14 would preferably be provided with a suitable visual indication of the time delay setting calibrated in linear increments. Accordingly, the wall thickness of tubular member 5 is indicated by the time delay setting which produces the maximum meter reading.

An improved response can be obtained by positioning the transducers to take advantage of the directional characteristic of these transducers. A transducer housing 21 is illustrated in FIG. 1a, which can be used in place of transducer housing 1. A transmitting transducer 22 is cemented in a position such that the ultrasonic energy generated is beamed toward the receiving transducers 23 and 24 (the angle between the perpendicular to the pipe surface and the perpendicular to the front side of the transmitting transducer 22 is exaggerated to clearly illustrate the arrangement). Receiving transducer 23 is positioned at an angle where it receives the maximum signal reflected from the outer surface of tubular member 5. Receiving transducer 24 is positioned at an angle where it receives the maximum first reflection signal reflected off the inner surface of tubular member 5. In other words, transmitting transducer 22 and receiving transducer 23 are directed toward the same point on the outer surface of tubular member 5, and transmitting transducer 22 and receiving transducer 24 are directed toward the same point on the inner surface of tubular member 5. It should also be noted that by so positioning the transducers the effect of stray reflected energy is further reduced.

The transmitting transducer can be positioned to optimize the establishment of one dominant mode of propagation in the pipe 6. The transmitting transducer can have its front side substantially parallel to the outer surface of pipe 6, as in the embodiment of FIG. 1, to generate predominantly longitudinal waves. Alternatively, the front side of the transmitting transducer can be disposed at such an angle with respect to the pipe surface, as illustrated in FIG. 1a, to produce predominantly shear waves. In this manner any adverse effect on the correlation of the signals caused by having two modes of wave propagation in the pipe is substantially eliminated.

FIG. 2 illustrates an embodiment of the invention which eliminates the need for manual adjustment of the time delay circuit. Many of the circuit components are essentially the same as those previously described with regard to FIG. 1, and, therefore, similar reference numerals are utilized.

Transmitting transducer 2, and receiving transducers 3 and 4 are shown schematically, but are actually positioned in a transducer housing similar to that shown in FIG. 1. The transmitting transducer is energized by a random noise generator 9 which is connected to the transmitting transducer via a wide band amplifier 10. Receiving transducer 3 is positioned to receive the portion of the ultrasonic energy from transmitting transducer 2, which is reflected off the outer surface of tubular member 5. Receiving transducer 4 receives ultrasonic energy from the transmitting transducer somewhat later in time after reflection off the inner surfaces of the tubular member.

Receiving transducer 4 is connected to one input of multiplier circuit 11 via wide band amplifier 12, and receiving transducer 3 is connected to the other input of multiplier circuit 11 via wide band amplifier 13, a variable time delay circuit 30 and a differentiator circuit 31. The variable time delay circuit 30 is essentially the same as time delay circuit 14 in FIG. 1, except that it is adapted for control by a mechanically connected servomotor 33. The output of multiplier circuit 11 is connected to the input of a direct current servoamplifier 32 via an integrating circuit 16, which includes resistor 17 and capacitor 18. The output of the servoamplifier is connected to control servomotor 33.

Differentiator circuit 31 is of conventional design and is inserted between delay circuit 30 and the input of multiplier circuit 11 to modify the output characteristic of the multiplier circuit so as to obtain a control signal suitable for controlling servomotor 33. The relationship between the integrated output potential $V_b$ of the multiplier circuit and the time delay provided by variable delay circuit 30 is illustrated in FIG. 2a. The characteristic curve has a negative slope passing through zero at a point where the time delay is equal to a value $\tau_1$, the value $\tau_1$ corresponding to the time delay equal to the difference in time required for the signals to reach receiving transducers 3 and 4 for a particular wall thickness. Accordingly, the potential $V_b$ applied to the servoamplifier is positive when the time delay is less than the value $\tau_1$, and is negative when the time delay exceeds the value $\tau_1$. Servomotor 33 is so connected to the variable time delay circuit that the time delay provided is increased when a positive potential is applied to the servomotor via servoamplifier 32, and such that the time delay is decreased when a negative potential is similarly applied. Accordingly, the servomotor will automatically adjust the time delay provided and come to rest when the time delay is equal to the value $\tau_1$.

A servoscale indicator 34 is attached to the end of the servomotor shaft to indicate the position at which the servomotor comes to rest. Since this position is related to the time delay $\tau_1$, and since the time delay $\tau_1$ is a function of the distance between the outer and inner surfaces of tubular member 5, the servoscale can be appropriately calibrated in linear increments to provide a direct indication of wall thickness.

Another embodiment of the invention is illustrated schematically in FIG. 3. Apparatus in accordance with this embodiment is particularly useful in installations where the "normal" thickness is known and an indication of the deviation of the thickness from the "normal" value is sufficient. The apparatus includes a transmitting transducer Z and two receiving transducers 3 and 4, which are mounted in a suitable transducer housing. The transmitting transducer is energized by a random noise signal generated by random noise generator 9 which is connected to the transmitting transducer via a wide band amplifier 10. Receiving transducers 3 and 4 are connected to the inputs of wide band amplifiers 13 and 12, respectively.

The output of amplifier 12 is connected to one of the inputs of each of the multiplier circuits 40 and 41, these multiplier circuits being essentially the same as multiplier circuit 11, previously described in FIG. 1. The output from amplifier 13 is connected to the other input of multiplier circuit 40 via a fixed time delay circuit 42, and is also connected to the other input of multiplier circuit 41 via a fixed time delay circuit 43. The output of multiplier circuit 40 is connected to one input terminal of a direct current voltage responsive meter 44 through a resistor 45. A capacitor 46 is connected between the meter input and ground such that resistor 45 and capacitor 46 form an integrating circuit. The output of multiplier circuit 41 is connected to ground through the series combination of resistor 47 and variable resistor 49. A capacitor 48 is connected to the junction between the resistors and ground, such that resistor 47 and capacitor 48 form an integrating circuit. A variable tap on resistance 49 is connected to the other input terminal of meter 44. Meter 44 provides a center scale indication when the potential difference at the meter input terminals is zero, and provides an indication to the right and left in accordance with the polarity and magnitude of the applied input potential.

The time delay $\tau_2$ provided by circuit 43 is so selected that the integrated output potential $V_c$ of multiplier circuit 41 attains a maximum value when the thickness D of the tubular member wall has a value $D_1$. The thickness $D_1$ is somewhat less than the "normal" anticipated wall thickness $D_n$. Similarly, the time delay $\tau_3$ is selected so that the integrated output potential $V_d$ from multiplier circuit 40 attains a maximum value when the thickness of the tubular member wall has a value $D_2$. The value of $D_2$ is somewhat greater than the "normal" anticipated thickness $D_n$. The tap on variable resistance 49 is adjusted so that the potential $V_c$ is equal to the potential $V_d$ when wall thickness is equal to the "normal" value $D_n$. The value of $V_c$ and $V_d$ are shown in the curves in FIG. 3a for various wall thicknesses D.

Meter 44 is connected to respond to the potential difference $V_d-V_c$. Accordingly, if the wall thickness corresponds to the normal value $D_n$, the potential difference is zero and meter 44 indicates this condition by a zero center scale indication. If the wall thickness is less than the value $D_n$, $V_c$ is greater than $V_d$ and, therefore, a negative potential is applied to meter 44. Under these circumstances, meter 44 provides a corresponding negative indication. If the wall thickness is greater than the normal value $D_n$, $V_d$ is greater than $V_c$ and a positive potential is applied to meter 44, resulting in a correspoding positive meter indication. It should be noted that between the limits $D_1$ and $D_2$ the potential applied to meter 44 increases as the deviation from the normal value $D_n$ increases and, therefore, meter 44 can be appropriately calibrated in linear units to indicate the deviation in thickess from the normal value.

Another embodiment of the invention is illustrated in FIG. 4, which is similar in operation to the FIG. 3 embodiment. The FIG. 4 embodiment, however, eliminates the need for multiplier circuits in the correlation detector and thus reduces costs considerably.

Referring to FIG. 4, the apparatus is illustrated as including a transmitting tansducer 2, ad receiving transducers 3 and 4 mounted in a suitable housing such as shown in FIG. 1. The transmitting transducer is energized by random noise generator 9 which is connected to the transducer via wide band amplifier 10. Receiving transducer 3 is responsive to the ultrasonic energy reflected off the outer surface of the tubular member 5, and receiving transducer 4 is responsive to ultrasonic energy reflected off the inner surface of the tubular member. The signals received by transducers 3 and 4 are essentially the same except for a time displacement corresponding to the different travel times required to reach the respective receivng transducers. Receiving transducers 3 and 4 are connected to wide band amplifiers 13 and 12, respectively.

The output of wide band amplifier 12 is connected to an inverter circuit 50. The output of the inverter circuit is connected to one input of a summation circuit 51 and to one input of a summation circuit 52. The output of wide band amplifier 13 is connected to the other input of summation circuit 51 via a fixed time delay circuit 53. The output of amplifier 13 is also connected to the other input of summation circuit 52 via a fixed time delay circuit 54. The inverter circuit is of conventional design and merely changes the polarity of the applied input signal, a characteristic which is common among most single stage amplifiers. Summation circuits 51 and 52 mathematically add the applied input signals and, therefore, the output signal is the sum of the two input signals. Time delay circuits 53 and 54 are of any conventional nonfrequency discriminating type.

The output of summation circuit 51 is connected to a squaring circuit 55, and the output of summation circuit 52 is connected to squaring circuit 56. These squaring circuits are of conventional design and porvide an output which is equal to the input signal multiplied by itself. In other words, the output from the squaring circuit is a multiple of the signal appearing at the input, and is always positive regardless of the polarity of the input signal. The output of squaring circuit 55 is connected to the input of an amplifier 59 via a resistor 57. A capacitor 58 is connected between the amplifier input and ground to form an integrating circuit with resistor 57. The output of amplifier 59 is connected to one of the input terminals of a direct current voltage responsive meter 62. The output of squaring circuit 56 is similarly connected to the other input termnial of meter 62 through an integrating circuit, formed by resistor 60 and capacitor 61, and an amplifier 62.

The circuit in FIG. 4 is approximately the equivalent of the circuit in FIG. 3; the reason for this can probably best be understood by referring to the mathematical expressions describing the operation of these circuits.

Referring first to FIG. 3, the signal developed by receiving transducer 3 can be represented by the expression $$f(t) \qquad (1)$$

The signal provided by transducer 4 is essentially the same, except for the delay in time, therefore this signal is represented by the expression $$f(t+\tau) \qquad (2)$$

The correlation function for the signals represented by expressions (1) and (2) is $$V_c(D) \approx \phi(\tau) = \frac{1}{T}\int_0^T f(t)f(t+\tau)\,dt \qquad (3)$$

Since one channel of the correlation detector, for example, the section including multiplier circuit 41, multiplies the signals from transducers 3 and 4, and subsequently integrates them to obtain the signal $V_c$, the expression for $V_c$ as a function of the thickness D is approximately equal to the correlation function as is also indicated in Equation 3 above where $\tau$ represents the difference in travel time required for the ultrasonic energy to reach the respective transducers.

The expressions $$f(t) \qquad (1)$$

and $$f(t+\tau) \qquad (2)$$

similarly describe the signals developed by transducers 3 and 4 in the FIG. 4 embodiment. Referring to the channel including summation circuit 51, the signal from transducer 4 is inverted and then added to the signal from transducer 3 in the summation circuit. The output from summation circuit 51 can therefore be represented by the expression $$f(t)-f(t+\tau) \qquad (4)$$

Since the output from the summation circuit is squared by squaring circuit 55 and subsequently integrated, the complete operation of the channel can be described by the equation $$\varphi(\tau) = \frac{1}{T}\int_0^T [f(t)-f(t+\tau)]^2 dt \qquad (5)$$

Equation 5 can be expanded to obtain $$\varphi(\tau) = \frac{1}{T}\int_0^T [f(t)]^2 - 2[f(t)f(t+\tau)] + [f(t+\tau)]^2 dt \qquad (6)$$

If the mean value of $f(t)$ does not vary appreciably, then the squared functions can be removed from the integral as constants, leaving the expression $$V_c(D) \approx \varphi(\tau) = \frac{-2}{T}(K)\int_0^T f(t)f(t+\tau)\,dt \qquad (7)$$

The potential $V_e$ as applied to meter 62 varies as a function of the thickness D in accordance with the operating characteristic of the circuit, as is expressed in Equation 7. It should be noted that the operating characteristics expressed in Equations 3 and 7 are essentially the same, except for the value of the constants and the sign of the expression and therefore the circuits in FIG. 4 perform the same functions as those in FIG. 3.

The relationship between the potential $V_e$ and the wall thickness D, i.e., the function $V_e(D)$ is illustrated in FIG. 4a. Correlation occurs when the wall thickness is $D_1$ and the corresponding difference in travel time required for the ultrasonic energy to reach the respective transducers is equal to the time delay $\tau_2$ provided by circuit 53. A similar mathematical expression can be developed for the other channel of the correlation detector which includes summation circuit 52. If the time delay $\tau_3$, provided by circuit 54, corresponds to the difference in travel time when the wall thickness has a value $D_2$ which is greater than $D_1$, the characteristic of the potential $V_f$ as a function of wall thickness D would be as shown in FIG. 4a.

The operation of the correlation detector in FIG. 4 can also be explained without mathematical expression. The signals developed by receiving transducers 3 and 4 are essentially the same, except for the difference in time. Assume that the wall thickness has a value $D_1$ such that the time difference between the signals corresponds to the time delay $\tau_2$ provided by delay circuit 53. Under these circumstances, the corresponding portions of the signals from transducers 3 and 4 are applied to summation circuits 51 at the same time. Since the signal from transducer 4 is inverted, cancellation occurs and, therefore, the output signal applied to squaring circuit 55 is nominal or essentially zero. The zero signal, when squared and integrated, is still zero and, therefore, under these circumstances, the potential $V_e$ applied to meter 62 has a minimum value. As the wall thickness deviates from the value $D_1$, less cancellation takes place in the summation circuit and, therefore, the signal $V_e$ increases accordingly. The other channel of the correlation detector operates similarly with respect to a wall thickness $D_2$ and time delay $\tau_3$.

Meter 62 is connected to respond to the potential difference $V_f - V_e$, or, in other words, the difference in potential at the output of amplifiers 59 and 62. The gains of amplifiers 59 and 62 are so adjusted that potential $V_e$ is equal to potential $V_f$ when the wall thickness is of the "normal" value $D_n$. Thus, if the wall thickness has the "normal" value, meter 62 indicates this condition by a center scale zero indication. As the wall thickness deviates from the value $D_n$, meter 62 indicates the direction and magnitude of the deviation.

Another embodiment of the invention is illustrated schematically in FIG. 5 wherein three separate correlations detection circuits are utilized to provide, respectively, indications of "normal" wall thickness, "too thin" a wall thickness, and "too thick" a wall thickness. The individual correlation detectors are similar to those previously described in FIG. 4.

Referring to FIG. 5, a transmitting transducer 2, and a pair of receiving transducers 3 and 4 are shown schematically, but are actually positioned in a suitable transducer housing such as shown in FIG. 1. The transmitting transducer is energized by a random noise generator 9 connected to the transducer via a wide band amplifier 10. The transmitting transducer generates a corresponding ultrasonic signal which is propagated toward tubular member 5, the wall thickness of which is being measured. Receiving transducer 3 is positioned to receive the energy reflected off the outer surface of the tubular member, and receiving transducer 4 is positioned to subsequently receive energy reflected off the inner surface of the tubular member. Receiving transducers 3 and 4 are connected to the input of wide band amplifiers 13 and 12, respectively.

The correlation detector, designated as the "too thin" channel, includes a summation circuit 70. Wide band amplifier 12 is connected to one input of summation circuit 70 via a cathode follower circuit 71. The cathode follower circuit is of conventional design and the summation circuit is similar to that previously described in FIG. 4. Amplifier 13 is connected to the other input of summation circuit 70 via a cathode follower circuit 72 and a fixed time delay circuit 73 similar to those previously described. The output of summation circuit 70 is connected to a squaring circuit 74 similar to that described in FIG. 4. The output of the squaring circuit is connected to a direct current voltage responsive meter 70 via a resistor 75 and a capacitor 76, the resistor and capacitor being connected to form an integrating circuit.

It should be noted that there is no inverter circuit in this correlation detector and, therefore, when the difference in travel time required for the ultrasonic energy to reach the respective receiving transducers is equal to the time delay $\tau_4$ provided by delay circuit 73, there is no cancellation of signals in summation circuit 70. As the difference in travel time becomes increasingly different from the time delay value $\tau_4$, increasing cancellation takes place in summation circuit 70, and, therefore, the potential detected by meter 77 decreases accordingly. The time delay provided by circuit 73 is so selected that a maximum indication appears on meter 77 when the wall thickness of tubular member 5 is somewhat less than the "normal" value.

The "normal" channel is similarly constructed and operates in the same manner. This "normal" channel includes a summation circuit 80, one input of which is connected to amplifier 12 via cathode follower circuit 81, and the other input of which is connected to amplifier 13 via a fixed time delay circuit 83 and a cathode follower 82. The output of the summation circuit is connected to a voltage responsive indicating meter 87 via a squaring circuit 84 and an integrating circuit, including resistor 85 and capacitor 86. The time delay $\tau_5$ provided by delay circuit 83 is selected so that meter 87 provides a maximum indication when the wall thickness of tubular member 5 has a particular, desired value referred to as the "normal" wall thickness.

The "too thick" channel in like fashion includes a summation circuit 90 whch is connected to amplifier 12 via a cathode follower circuit 91, and to amplifier 13 via a cathode follower circuit 92 and fixed time delay circuit 93. The output of the summation circuit is connected to a voltage responsive indicating meter 97 via a squaring circuit 94 and an integrating circuit, including resistor 95 and capacitor 96. The time delay $\tau_6$ provided by delay circuit 93 is so selected that meter 97 provides a maximum indication when the wall thickness measured is greater than the "normal" thickness.

In operation, if a wall thickness corresponding to the "normal" value is adjacent the transducers, meter 87 provides a maximum indication and meter 77 and 97 provide nominal indications. As the wall thickness decreases, the indication on meter 87 decreases and the indication on meter 77 increases while the indication on meter 97 remains nominal. Correspondingly, as the wall thickness increases, the indication on meter 87 decreases and the indication on meter 97 increases while the indication on meter 77 remains nominal. Thus, in this manner, it can easily be determined whether the wall thickness is within prescribed limits, and it can also be determined approximately how much the wall thickness deviates from the "normal" thickness.

While several specific embodiments of the invention have been described in detail, these by no means exhaust all of the possible embodiments. It should also be noted that even though the invention has been described as a thickness measuring apparatus, the invention is not so limited, since an inaccessible surface is only one example of a discontinuity which reflects ultrasonic energy. For example, the apparatus can be adapted to provide an indication of a flaw when adjacent the tarnsducers and, furthermore, can be adapted to provide an indication of the distance of this flaw from the surface. For example, referring to FIGS. 1 and 1b, if a flaw or the like is present in tubular member 5, ultrasonic energy will be reflected from the flaw as well as the inner surface of tubular member 5, and this energy will be received by transducer 4. The characteristic curve, as shown in FIG. 1b, would have a double peak, one peak occurring at the time delay corresponding to the distance of the flaw from the surface, and the second peak corresponding to the distance of the inner surface from the outer surface. Accordingly, the apparatus can be used for thickness measurements or for detection of discontinuities. The invention is more particularly defined in the appended claims.

What is claimed is:

1. In ultrasonic measuring apparatus for measuring the distance of discontinuities from the adjacent surface of a member under test, the combination of,
   a transmitting transducer energized to provide a source of propagating ultrasonic energy having a large number of overlapping transient disturbances occurring at random, the level of said energy being substantially flat over a wide band of frequencies;
   a first receiving transducer responsive to ultrasonic energy reflected off an adjacent surface of the member being measured;
   a second receiving transducer responsive to ultrasonic energy which passes through a portion of the member being measured and which is reflected off a discontinuity other than said adjacent surface;
   a first correlation detection circuit connected to said receiving transducers for providing an output signal which is related to the difference in travel time required for said ultrasonic energy to reach the respective receiving transducers in accordance with a first function;
   a second correlation detection circuit connected to said receiving transducers for providing an output signal which is related to said difference in travel time in accordance with a second function; and
   indicating means connected to said first and second detection circuits and responsive to deviations in said output signals from a known standard established for a discontinuity at a desired distance from said adjacent surface.

2. The apparatus in accordance with claim 1 wherein said first and second correlation detection circuits each comprise a multiplier circuit connected to said receiving transducers and a fixed time delay circuit interconnected between said multiplier circuit and said first receiving transducer, and wherein the time delays provided by said time delay circuits are different.

3. An ultrasonic measuring apparatus in accordance with claim 1, wherein said first and second transducers are positioned in close proximity to one another so as to be in said first and second paths of reflected energy, and wherein said first transducer is placed closer to said source means than said second transducer, the addition of
   a partition located between said first and second receiving transducers for preventing an appreciable amount of ultrasonic energy reflected off an adjacent surface of the member from being received by said second receiving transducer.

4. An ultrasonic measuring apparatus in accordance with claim 1, wherein
   each of said correlation detection circuits is relatively unaffected by extraneous signals detected by only one of said first and second receiving transducers.

5. In ultrasonic measuring apparatus, the combination of
   means for providing a continuous source of propagating ultrasonic energy;
   a first transducer responsive to said ultrasonic energy traveling via a first path;
   a second transducer responsive to said ultrasonic energy traveling via a second path,
      said transducers being so disposed that at least one of said paths passes through a member being measured such that the length of the path is determined by a characteristic of the member,
      said first and second transducers being positioned in close proximity to one another so as to be in said first and second paths of reflected energy, said first transducer being placed closer to said source means than said second transducer;
   correlation detection means connected to said transducers for indicating the difference in travel time of said energy along said first and second paths to thereby indicate the difference in path lengths, and
   a partition located between said first and second transducers for preventing an appreciable amount of ultrasonic energy reflected off an adjacent surface of the member from being received by said second transducer.

6. In ultrasonic measuring apparatus, the combination of,
   a transmitting transducer energized to provide a continuous source of propagating energy;
   a first receiving transducer responsive to ultrasonic energy reflected off an adjacent surface of the member being measured;
   a second receiving transducer responsive to ultrasonic energy which passes through a portion of the member being measured and which is reflected off a discontinuity other than said adjacent surface;
      said first and second transducers being positioned in close proximity to one another so as to be in said first and second paths of reflected energy, said first transducer being placed closer to said transmitting source than said second transducer,
   a correlation detection circuit connected to said receiving transducer and responsive to the difference in travel time required for said ultrasonic transducers to provide a corresponding indication of the distance between said adjacent surface and said discontinuity; and
   a partition located between said first and second receiving transducers for preventing an appreciable amount of ultrasonic energy reflected off an adjacent surface of the member from being received by said second receiving transducer.

7. In ultrasonic measuring apparatus, the combination of,
   a transmitting transducer energized to provide a continuous source of propagating ultrasonic energy;
   a first receiving transducer responsive to ultrasonic energy reflected off an adjacent surface of the member being measured;
   a second receiving transducer responsive to ultrasonic energy which passes through a portion of the member being measured and which is reflected off a discontinuity other than said adjacent surface;
      said first and second receiving transducers being positioned in close proximity to one another so as to be in said first and second paths of reflected energy,
      said first transducer being placed closer to said transmitting source than said second transducer,
   a correlation detection circuit for providing a signal indication of the distance between said adjacent surface and said discontinuity, comprising
      a multiplier circuit so connected to said first and second receiving transducers that the output potential therefrom is a function of the difference in travel time required for said ultrasonic energy to reach the respective receiving transducers, and
      indicating means responsive to said output potential; and
   a partition located between said first and second receiving transducers for preventing an appreciable amount of ultrasonic energy reflected off an adjacent surface of the member from being received by said second receiving transducer.

(References on following page)

References Cited by the Examiner

UNITED STATES PATENTS

| | | |
|---|---|---|
| 2,253,975 | 8/1941 | Guanella. |
| 2,612,772 | 10/1952 | McConnell _____ 73—67.5 |
| 2,667,063 | 1/1954 | Cunningham _____ 73—67.5 |
| 2,688,124 | 8/1954 | Doty et al. |
| 2,768,524 | 10/1956 | Beard _____ 73—53 |
| 2,878,713 | 3/1959 | Blackstone. |
| 2,907,400 | 10/1959 | Swafford _____ 235—181 X |

RICHARD C. QUEISSER, *Primary Examiner.*

DAVID SCHONBERG, *Examiner.*

ERNEST F. KARLSEN, JAMES J. GILL,
*Assistant Examiners.*